United States Patent [19]

Gupta et al.

[11] 4,228,497
[45] Oct. 14, 1980

[54] TEMPLATE MICROMEMORY STRUCTURE FOR A PIPELINED MICROPROGRAMMABLE DATA PROCESSING SYSTEM

[75] Inventors: Ram K. Gupta, Downington; Chandrakant R. Vora, Audubon, both of Pa.

[73] Assignee: Burroughs Corporation, Detroit, Mich.

[21] Appl. No.: 838,070

[22] Filed: Nov. 17, 1977

[51] Int. Cl.³ .......................... G06F 9/38; G06F 13/00
[52] U.S. Cl. ..................................................... 364/200
[58] Field of Search ............... 364/200 MS File, 736, 364/900 MS File

[56] References Cited

U.S. PATENT DOCUMENTS

| | | | |
|---|---|---|---|
| 3,544,973 | 12/1970 | Borck, Jr. et al. | 364/200 |
| 3,566,364 | 2/1971 | Hauck | 364/200 |
| 3,629,853 | 12/1971 | Newton | 364/200 |
| 3,634,828 | 1/1972 | Myers et al. | 364/200 |
| 3,787,673 | 1/1974 | Watson et al. | 364/200 X |
| 3,815,095 | 6/1974 | Wester | 364/200 |
| 3,875,391 | 4/1975 | Shapiro et al. | 364/200 X |
| 3,900,836 | 8/1975 | Salvo | 364/200 |
| 3,988,719 | 10/1976 | Whitby et al. | 364/200 |
| 4,025,771 | 5/1977 | Lynch, Jr. et al. | 364/200 X |
| 4,040,029 | 8/1977 | Young | 364/900 |

*Primary Examiner*—Melvin B. Chapnick
*Attorney, Agent, or Firm*—Leonard C. Brenner; Edmund M. Chung; Kevin R. Peterson

[57] ABSTRACT

In a microprogrammed data processing pipeline system comprising a plurality of stages, microinstructions for controlling the stages are stored as templates in an addressable template micromemory store and are provided automatically and sequentially to the stage of the pipeline system. Each template is associated with an individual set of data and includes microinstructions for each stage, whether real or virtual, through which the associated set of data passes. The template micromemory store is segmented into a plurality of individually addressable micromemory units with each unit therein storing microinstructions for an individually associated stage in the data processing pipeline system.

4 Claims, 7 Drawing Figures

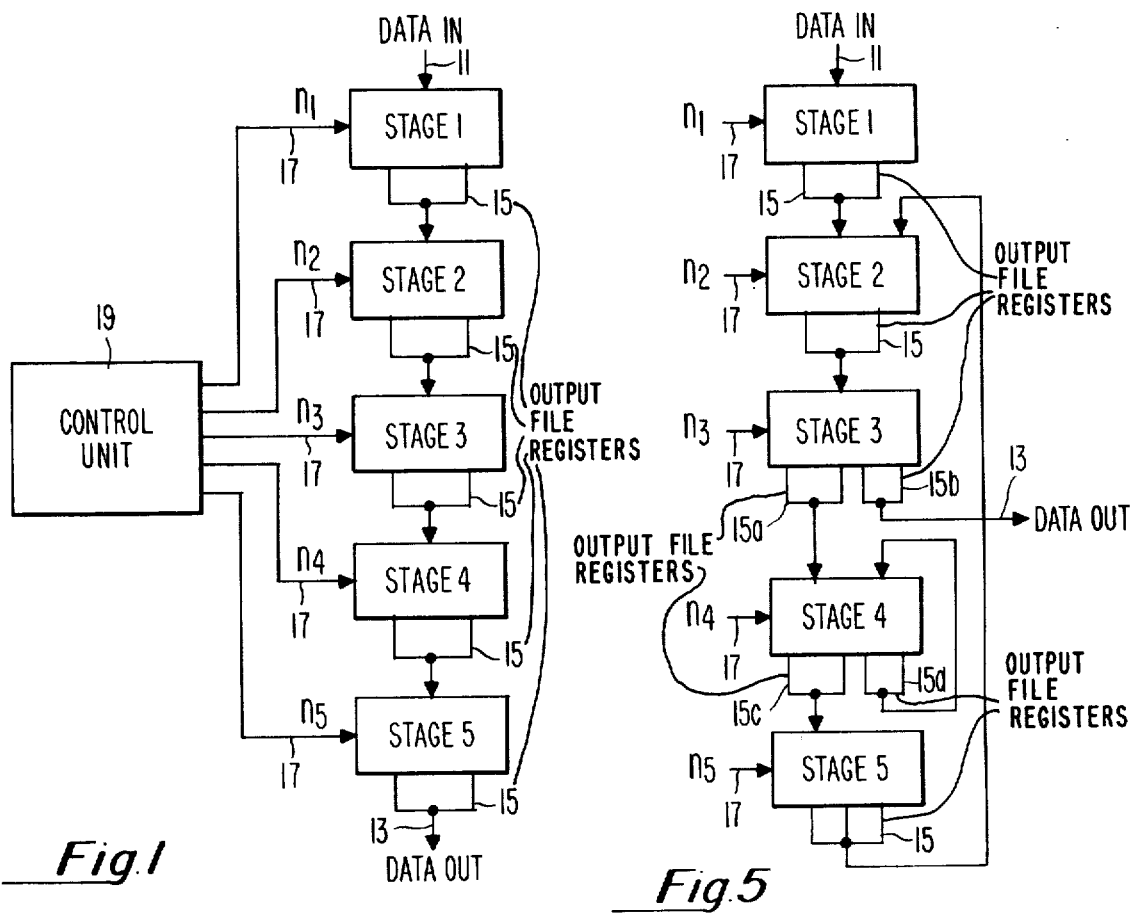
*Fig.1*
*Fig.5*
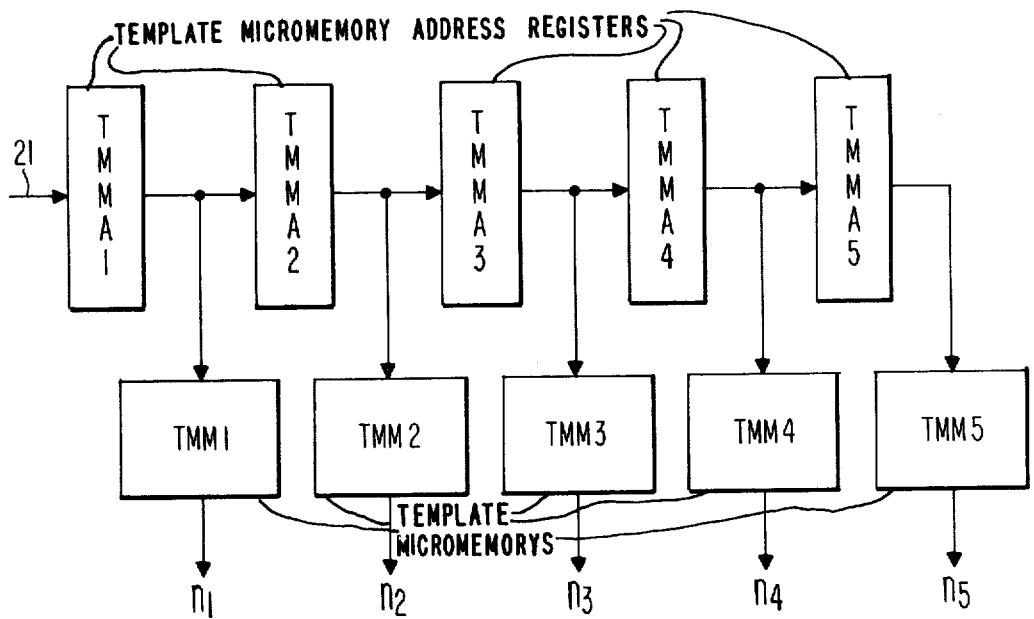
*Fig.2*

TEMPLATE MICROMEMORY STRUCTURE FOR A PIPELINED MICROPROGRAMMABLE DATA PROCESSING SYSTEM

REFERENCE TO RELATED APPLICATION

In co-pending application, Ser. No. 782,374, now U.S. Pat. No. 4,101,960, issued July 18, 1978, for a "Scientific Processor", filed Mar. 29, 1977, in the name of Richard A. Stokes et al, and assigned to the assignee of the present invention, there is described and claimed a scientific processor utilizing a parallel pipeline array under template control. Although not limited thereto, the present template micromemory system invention may be applied to the pipeline array disclosed therein.

BACKGOUND OF THE INVENTION

In the area of data procesors, a pipeline system is a system having computational and combinational capabilities divided into several sequential stages, each of which may be active with an independent set of data at the same instant of time. Data is viewed as flowing from one pipeline stage where it is acted upon or processed to another for further action or processing. To increase pipeline throughput new data is fed to the first stages thereof while old data is still being acted upon in the latter stages. Maximum throughput wherein all stages are busy all of the time is a goal seldom achieved in any pipeline system over an extended period of time.

Often the pipeline system is microprogrammable wherein each stage thereof responds to microinstructions. For example, an arithmetic element stage may respond to microinstructions requesting arithmetic operations such as add, divide, multiply, etc., and to other control instructions requesting Boolean operations to be performed. A simple memory stage may be requested by a control microinstruction to read from a particular address, and to output to a particular bus, register or stage, or to store data in a particular address. In microprogrammable pipeline system design striving to maximize throughput, the task of providing the proper control microinstructions to the various stages in correct sequential order becomes quite complex, see "The Microprogramming of Pipelined Processors", P. M. Kogge, THE FOURTH ANNUAL SYNPOSIUM ON COMPUTER ARCHITECTURE, pp 63-69.

Additional problems in microprogrammably controlling pipline stages occur when feedback flow within and among the stages is allowed. Feedback flow allows data to be fully processed in one complete flow through the pipeline and eliminates the need for duplicate stages in the pipeline, which stages may be required by only a small percentage of the data flowing therethrough.

A set of microinstructions controlling the flow of an individual set of data through the pipeline is a template. The overall flow of data through the pipeline then becomes controlled by a sequence of templates. The templates must be stored and fed to the pipeline stages in a manner to avoid collisions. This becomes particularly important and increasingly difficult in situations involving pipeline feedback.

OBJECTS AND SUMMARY OF THE INVENTION

It is therefore an object of the present invention to provide an improved template control microinstruction storing system for a microprogrammable system.

It is a further object of the invention to provide a template storing system for automatically providing control microinstructions in proper sequence to a pipeline system.

It is yet a further object of the invention to provide a template storing system for providing microinstructions automatically and sequentially in a simple reliable manner for microprogrammable pipeline systems having or permitting feedback.

The above and other objects of the invention are realized by providing a micromemory storage system for addressably storing a plurality of microinstructions including at least one microinstruction for each stage in a microprogrammable pipeline system. A micromemory address register system addresses the micromemory system to provide sequentially a microinstruction for each stage in the microprogrammable pipeline system.

The system configuration and operational details given above have been presented in simplified form. Other features of the invention will become more fully apparent in the drawings and detailed description presented hereinafter.

BRIEF DESCRIPTION OF THE DRAWINGS

FIG. 1 is a block diagram illustrating the pipeline operating system environment of the present invention;

FIG. 2 is a diagram depicting the template micromemory system of the present invention for use in the pipeline environment of FIG. 1;

FIG. 5 is a block diagram illustrating the pipeline operating system of FIG. 1 wherein feedback between and among the pipeline stages occur;

DESCRIPTION OF THE PREFERRED EMBODIMENT

Figure 3:
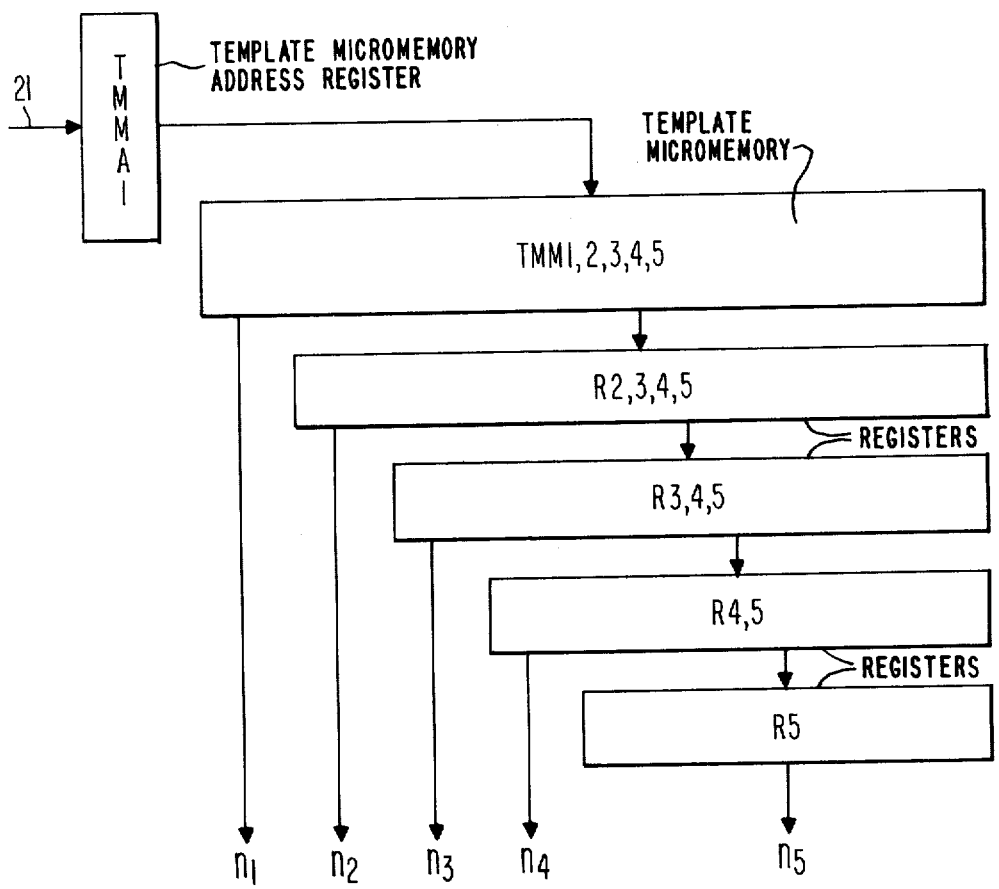
FIG. 3 is a diagram depicting an alternate embodiment of the template micromemory system.

The pipeline template controlling mechanism of the preferred invention functions to control and process the flow of data through a plurality of microprogrammable stages, see FIG. 1. Data is inputted into Stage 1 through data input channel 11 and pipelined successively through Stages 2, 3, 4 and 5 to data output channel 13. Each Stage 1-5 has an associated output file register 15 to facilitate data flow to the successive stage or to the data output channel 13. Each Stage 1-5 also includes a control input 17 for received microcoded instructions n1 through n5 respectively, from a controlling unit 19.

In co-pending application Ser. No. 682,586, now U.S. Pat. No. 4,051,551, issued Sept. 27, 1977, for a Multidimensional Parallel Access Computer Memory, filed May 3, 1976 in the name of D. H. Lawrie et al and assigned to the assignee of the present invention, Stages 1 through 5 of the present invention are realized as the memory, alignment and processing stages of a parallel processor. The present invention may be employed with either parallel or serial processors, as long as each stage thereof is microprogrammable and all stages together function in a pipelined function regarding data flow and processing.

Each pipeline Stage 1-5 responds to microcoded instructions applied to its control input 17. For example, microcode instruction n1 may direct Stage 1 to store data from the data input channel 11 or to transfer data to Stage 2. The address of the data to be stored or transferred need not be supplied within the code instruction n1 as the address may readily be supplied from some other source (not shown).

In the preferred embodiment, the controlling unit 19 issued every cycle microcode instructions n1 through n5 to direct the concurrent funtioning of pipeline Stages 1 through 5. The microcode instructions n1 through n5 are stored respectively in a plurality of template micro-memories TMM1 through TMM5, see FIG. 2. Each micro-memory TMM1 through TMM5 is addressed by individually associated template micro-memory address registers, TMMA1 through TMMA5 respectively.

Figure 4:
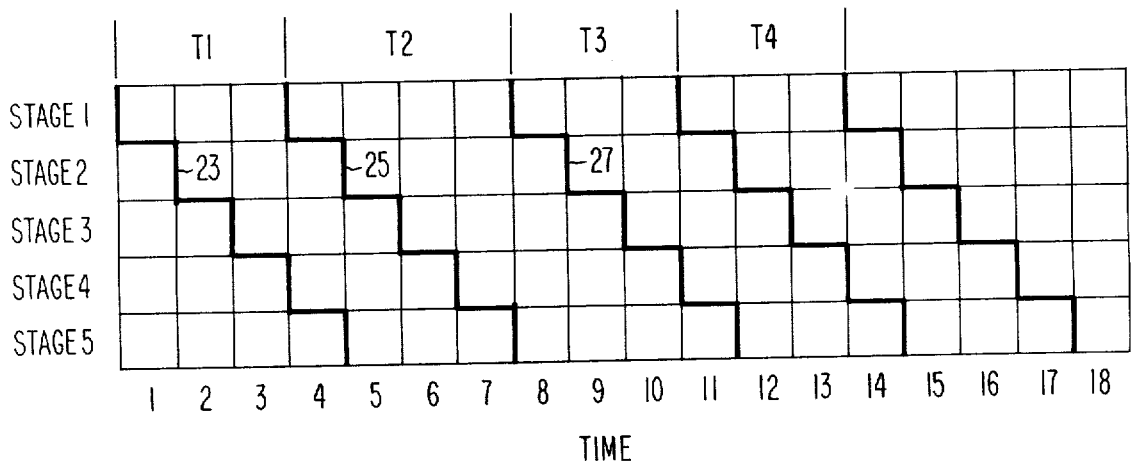
FIG. 4 is a timing chart showing the layout of templates for controlling the pipeline system of FIG. 1.

A template micro-memory address is supplied to register TMMA1 via TMM address bus 21 each time a new template is to be initiated, as illustrated in FIG. 4 time period 1 for template T1. On the next clock period the address in TMMA1 is transferred to TMMA2 and TMMA1 is transferred by one address unit. On each clock period the address stored in TMMA1 is transferred to TMMA2, the address of TMMA2 to TMMA33, the address of TMMA3 to TMMA4, and the address of TMMA4 to TMMA5.

TMMA1 is incremented by one clock period for a given template, i.e., time periods 2 and 3 for template T1. Following the conclusion of generating microinstruction n1 for a given template (time period 3 for template T1), TMMA1 is either reset (i.e., reset to an address which will effectuate the generation of microinstructions n1 through n5 which will initiate no function in pipeline Stages 1 through 5) or set to the beginning of a new template.

The above-described method of addressing the template micro-memories TMM1 through TMM5 defines the storage structure of same. For example, the initial control instructions n1 through n5 for a given template are all stored at the same address in their respective micro-memories TMM1 through TMM5. The same storage pattern remains for subsequent control instructions n1 through 5 of each template.

In an alternate embodiment, see FIG. 3, an address register TMMA1 addresses a single template micro-memory TMM1,2,3,4,5 programmed to provide all pipeline control signals n1-n5. Once addressed the template micro-memory provides control instruction n1 directly and stores all other control instructions in a register R2, 3, 4, 5. Subsequently, register R2, 3, 4, 5 is clocked to provide control instruction word n2 and to store the remaining control instructions in register R3, 4, 5. This process is continued in fashion until control instruction n5 is clocked out of register R5.

It is appreciated that the embodiments of FIG. 2 and FIG. 3 may be combined in a hybrid manner if so desired. For example, the embodiment of FIG. 2 may be used to provide all but the last two control word segments n4 and n5 and the embodiment of FIG. 3 may be utilized to generate the last two control word segments n4 and n5.

A set of control instructions comprises a template. Templates occur sequentially one after another, see FIG. 4. As plotted, a template occupies a diagonally sliced area on a pipeline stage versus time chart, FIG. 4. A first template T1 occupies the time period 1 through 3 for pipeline Stage 1, in which pipeline Stage 1 responds to provided control instruction n1. The area encompassed by the first template T1 continues diagonally shown in the chart to the time period 5 through 7. The area encompassed by the first template T1 is bounded by a front diagonal 23 and a rear diagonal 25. The rear diagonal 25 also serves as the front diagonal of the next template T2. Alternately, template T2 could be delayed one or more time periods if desired. Template T2 has a rear diagonal 27. It can be seen that template T2 is controlling Stage 1, while the previous template T1 is controlling Stage 5. In this overlapping manner, all pipeline stages are kept busy. T2 as shown spans four time periods thus indicating that it requires at least four time periods to complete its task in at least one of pipeline Stages 1-5. Subsequent templates (i.e., T3 and T4) follow in order.

The control for issuing templates is simple under the present invention. The address for template T1 is fed to the template micro-memory address register TMMA1 to initiate the sequence. Three time periods later the address for template T2 is sent to the register TMMA1. Four time periods later the address for template T3 is sent to the register TMMA1. The generation of the control instructions n1-n5 are automatically provided sequentially in proper order as described above.

The present invention is readily extended to pipelines having feedback, see FIG. 5. The output register 15 for pipeline Stage 3 consists of two parts, output register 15a for feeding pipeline Stage 4 and output register 15b for providing data to data output channel 13. Likewise the output register 15 for pipeline Stage 4 consists of two parts; output register 15c for feeding pipeline Stage 5 and output register 15d for recycling data through pipeline Stage 4.

Figure 6:
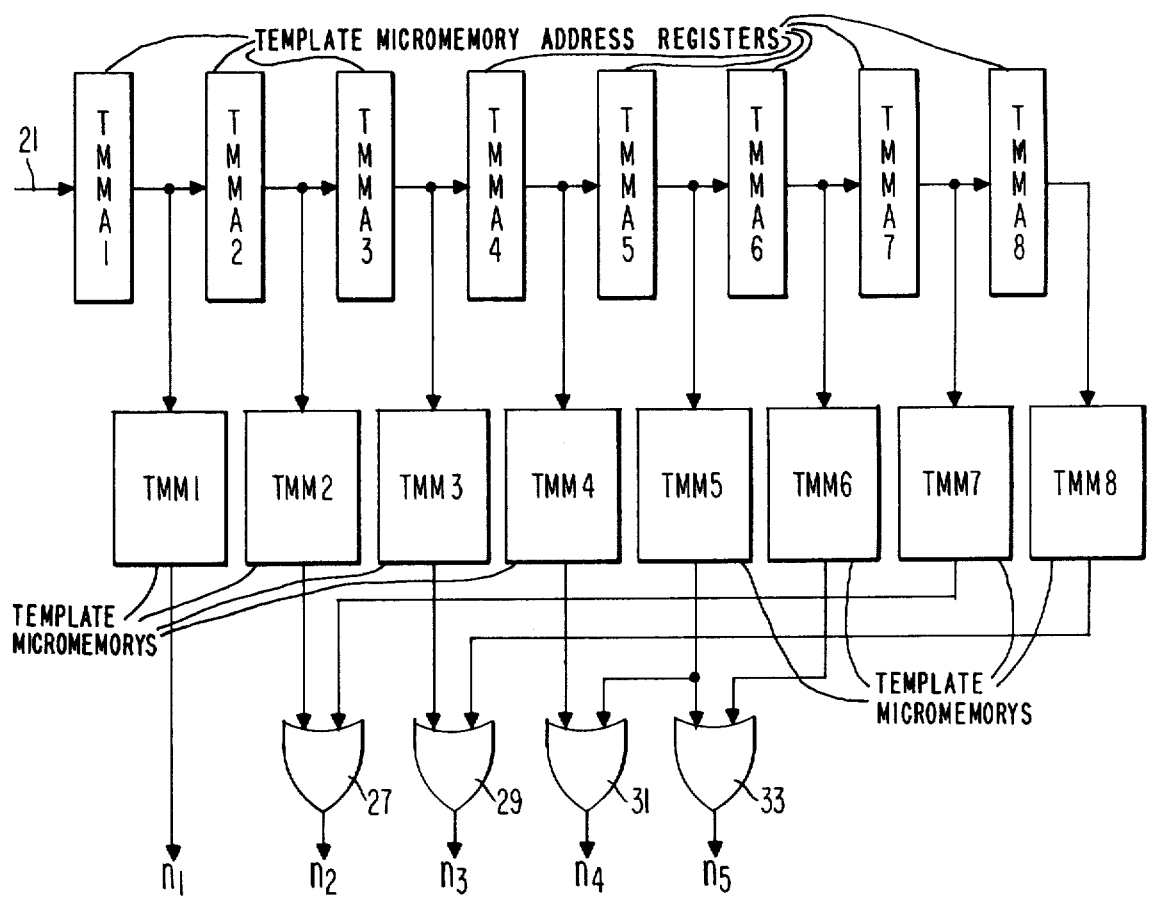
FIG. 6 is a diagram depicting the template micromemory system of the present invention for use in the pipeline environment of FIG. 5.

With reference to FIG. 6, the control instructions n1 through n5 for the pipeline network of FIG. 5 comprises template micro-memories TMM1 through TMM8, an OR gate 27 for providing the micro-word n2 from TMM2 or TMM7, an OR gate 29 for providing n3 from TMM3 or TMM8, an OR gate 31 for providing n4 from TMM4 or TMM5 and an OR gate 33 for providing n5 from TMM5 or TMM6. Thus the five physical pipeline stages are controlled as eight virtual stages.

Figure 7:
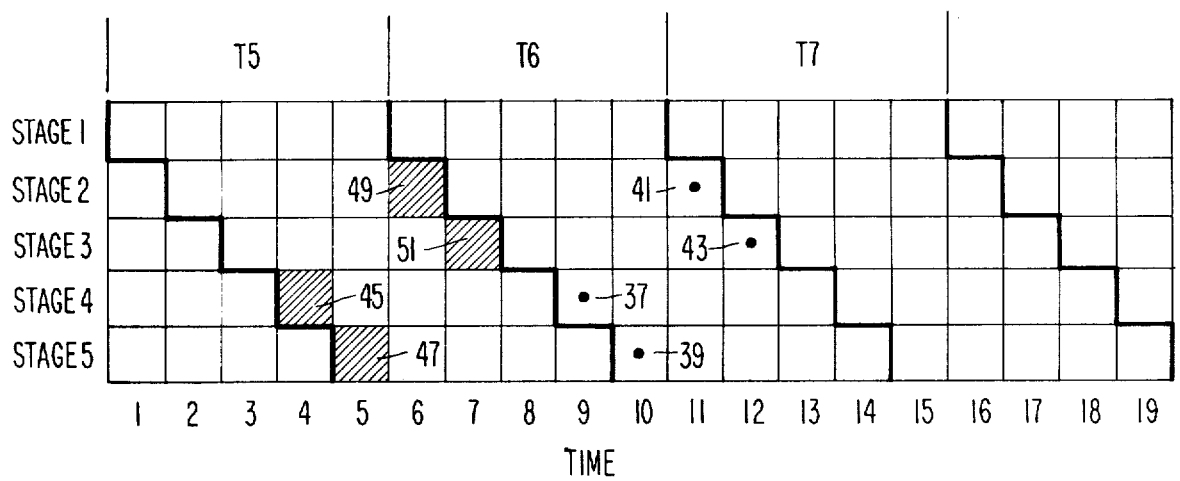
FIG. 7 is a timing chart showing the layout of templates for controlling the pipeline system of FIG. 5.

Template T5, see FIG. 7, illustrates a typical controlling template for the feedback pipeline Stages of FIG. 5. It is noted that four stage-time areas shown in template T6 are used in template T5 as noted by the dots 37, 39, 41 and 43. To prevent template "spill-over" such as illustrated by dots 37, 39, 41 and 43 the templates could be laid out for eight (8) virtual stages rather than for five (5) real stages as shown. Dot 37 is coded in TMM5, dot 39 in TMM6, dot 41 in TMM7 and dot 43 in TMM8. However, making all 8 stages real would be inefficient and would fail to keep all stages relatively busy under conditions wherein feedback operations were required only by a few templates.

Template 5 also includes a four stage-time area not used for control as denoted by shaded areas 45, 47, 49 and 51. Thus, template 6 could be a template having the same form as template 5 such that the unused areas 45, 47, 49 and 51 permit the use of these areas by the overflow of template 5 as indicated by dots 41, 43, 45 and 47. When faced with an overflow template such as template T5 the template micro-memory addressing registers must either not address a new template until all is clear (i.e., do nothing during the T6 time period and initiate T7 as the next template) or send only a non-conflicting template for the template T6 (such as a template of the form of template T5.).

Above-described area specific embodiments for a template micro-memory and controlling unit for automatically and sequentially providing control microwords to microprogrammable stages of a pipeline network. Although the present invention has been described with a certain degree of particularity, it should be understood that the present disclosure has been made by way of example and that changes in the combination and arrangement of parts obvious to one skilled in the art may be resorted to without departing from the scope and spirit of the invention. As an example, a decoder may be employed between the controlling unit and the pipeline stages to decode or modify the controlling data stored in the template micro-memories before passing the data on as control instructions to the pipeline stages.

What is claimed is:

1. A template micromemory structure for providing a series of addressed microinstructions to a pipelined data processing system, said structure comprising:

a plurality of addressable template micromemory units for storing microinstructions;

a plurality of microprogrammable pipelined stages, each stage therein associated with and receiving addressed microinstructions from at least one template micromemory unit in said plurality thereof with at least one stage thereof receiving addressed microinstructions from at least two template micromemory units in said plurality thereof; and template micromemory addressing means connected to said plurality of addressable template micromemory units, said template micromemory addressing means addressing concurrently in each template micromemory units in said plurality thereof a microinstruction stored therein, said addressing means including a first address register serially followed by a plurality of serially connected address registers, said first register initially storing a first instruction address and sequentially incremented through a series of microinstruction addresses in coordination with data flow through said pipelined data processing system, each register in said following plurality thereof temporarily and sequentially storing an address previously stored in its serially preceding register, each register in said following plurality thereof and said first register individually associated with a single unit in said plurality of addressable template micromemory units for addressing a microinstruction stored therein, whereby said plurality of addressable template micromemory units are provided a series of microinstruction addresses and said pipelined data processing system is provided a series of addressed microinstructions.

2. The template micromemory structure according to claim 1 further including:

OR logic means interconnecting each microprogrammable logic stage in said at least one stage receiving addressed microinstructions from said at least two template micromemory units with said at least two template micromemory units for receiving said addressed microinstructions therethrough.

3. The template micromemory structure according to claim 2 wherein said first register is incremented in clocked synchronization with data flow through said pipelined data processing system.

4. The template micromemory structure according to claim 1 wherein said first register is incremented in clocked synchronization with data flow through said pipelined data processing system.

* * * * *